United States Patent [19]

Schrank et al.

[11] Patent Number: 5,519,374

[45] Date of Patent: May 21, 1996

[54] HYBRID THERMISTOR TEMPERATURE SENSOR

[75] Inventors: Franz Schrank, Graz; Gerald Kloiber, Feldkirchen/Graz, both of Austria

[73] Assignee: Siemens Matsushita Components GmbH & Co., KG, Munich, Germany

[21] Appl. No.: 296,952

[22] Filed: Aug. 26, 1994

[30] Foreign Application Priority Data

Aug. 26, 1993 [DE] Germany .................. 43 28 791.3

[51] Int. Cl.$^6$ ............................................. H01C 7/10
[52] U.S. Cl. ........................ 338/22 R; 338/22 SD; 338/260; 338/320; 338/314
[58] Field of Search ................... 338/22 R, 22 SD, 338/260, 320, 314

[56] References Cited

U.S. PATENT DOCUMENTS

| | | | |
|---|---|---|---|
| 3,365,618 | 1/1968 | Obenhaus . | |
| 3,728,702 | 4/1973 | Miyamoto et al. . | |
| 4,413,170 | 11/1983 | Val et al. | 338/22 R X |
| 4,454,495 | 6/1984 | Werner et al. | 338/320 X |
| 4,670,731 | 6/1987 | Zeile et al. . | |
| 4,746,896 | 5/1988 | McQuoid et al. | 338/314 |
| 4,968,964 | 11/1990 | Nagai et al. . | |
| 5,057,674 | 10/1991 | Smith-Johannsen | 338/22 R X |
| 5,057,811 | 10/1991 | Strott et al. | 338/22 R |
| 5,258,736 | 11/1993 | Kristen et al. | 338/22 R |
| 5,448,103 | 9/1995 | de Wit | 338/22 SD |

FOREIGN PATENT DOCUMENTS

| | | |
|---|---|---|
| 0125366 | 11/1984 | European Pat. Off. . |
| 0532890 | 3/1993 | European Pat. Off. . |
| 1573350 | 11/1970 | Germany . |
| 2060610 | 9/1974 | Germany . |
| 3431811 | 3/1986 | Germany . |
| 4202733 | 8/1993 | Germany . |

*Primary Examiner*—Marvin M. Lateef
*Attorney, Agent, or Firm*—Herbert L. Lerner; Laurence A. Greenberg

[57] ABSTRACT

A hybrid thermistor temperature sensor includes a two-pole network of temperature-dependent resistors being in thermal and electrical contact with each other. The two-pole network has at least one temperature-dependent resistor with a positive temperature coefficient as a cold conductor, at least one temperature-dependent resistor with a negative temperature coefficient as a hot conductor, a temperature/resistance curve with a constant behavior or plateau in a predetermined temperature region, and at least one electrode electrically coupling at least two of the temperature-dependent resistors to each other. The at least one electrode is produced from a material ensuring a contact between the temperature-dependent resistors that breaks down a barrier layer and forms a diffusion barrier to a mutual diffusion of ingredients of each respective one of the contacting temperature-dependent resistors into the other of the temperature-dependent resistors.

11 Claims, 2 Drawing Sheets

HYBRID THERMISTOR TEMPERATURE SENSOR

BACKGROUND OF THE INVENTION

1. Field of the Invention

The present invention relates to a hybrid thermistor temperature sensor in the form of a two-pole network of temperature-dependent resistors in thermal and electrical contact with each other having positive and negative temperature coefficients as respective cold and hot conductors, a temperature/resistance curve with a constant behavior or plateau in a predetermined temperature region, and at least two of the temperature-dependent resistors being electrically coupled to each other through at least one electrode.

Thermistor temperature sensors in the form of two-pole temperature-dependent resistors with positive and negative temperature coefficients that are placed in thermal and electrical contact with each other, are known, e.g., from Published European Application No. 0 532 890 A1.

Furthermore, thermistor temperature sensors with combinations of more than two temperature-dependent resistors are generally known, e.g., with one hot conductor and two cold conductors, from European Patent No. 0 125 366 B1.

In order to provide the electrical coupling of the individual temperature-dependent resistor elements it is important for the junction resistances to have the lowest impedance and thus the lowest possible losses. The aforesaid publications do not deal with that problem.

SUMMARY OF THE INVENTION

It is accordingly an object of the invention to provide a hybrid thermistor temperature sensor, which overcomes the hereinafore-mentioned disadvantages of the heretofore-known devices of this general type and for which junction resistances between the individual resistors with positive and negative temperature coefficients have the lowest possible impedance.

With the foregoing and other objects in view there is provided, in accordance with the invention, a hybrid thermistor temperature sensor, comprising a two-pole network of temperature-dependent resistors being in thermal and electrical contact with each other, the two-pole network having at least one temperature-dependent resistor with a positive temperature coefficient as a cold conductor, at least one temperature-dependent resistor with a negative temperature coefficient as a hot conductor, a temperature/resistance curve with a constant behavior or plateau in a predetermined temperature region, and at least one electrode electrically coupling at least two of the temperature-dependent resistors to each other, the at least one electrode being produced from a material ensuring a contact between the temperature-dependent resistors that breaks down a barrier layer and forms a diffusion barrier to a mutual diffusion of ingredients of each respective one of the contacting temperature-dependent resistors into the other of the temperature-dependent resistors.

In accordance with another feature of the invention, the electrode material is at least one material selected from the group consisting of electrically conducting carbides, nitrides, oxide-nitrides and oxides.

In accordance with a further feature of the invention, the electrode material is selected from the group consisting of TiC, SiC, TiN, TiAlN, TiON, TiAlON and InSn-oxide.

In accordance with an added feature of the invention, the two-pole network has a series circuit of the resistor with a negative temperature coefficient, the resistor with a positive temperature coefficient, and the electrode disposed between the resistors.

In accordance with an additional feature of the invention, the resistor with a negative temperature coefficient serves as a substrate for the electrode and the resistor with a positive temperature coefficient.

In accordance with yet another feature of the invention, the resistor with a positive temperature coefficient is constructed as a one-piece disk.

In accordance with yet a further feature of the invention, the resistor with a positive temperature coefficient is constructed as a multilayer element.

In accordance with yet an added feature of the invention, there is provided an electrically inactive substrate on which a combination of the resistors with negative and positive temperature coefficients are disposed.

In accordance with yet an additional feature of the invention, the two-pole network has a combination of at least three of the resistors with negative and positive temperature coefficients being electrically coupled to each other through the electrodes.

In accordance with again another feature of the invention, the two-pole network has a combination of two of the resistors with a negative temperature coefficient and one of the resistors with a positive temperature coefficient being electrically coupled with each other through the electrodes, with one of the resistors with a negative temperature coefficient being in series with a parallel circuit of one of the resistors with a positive temperature coefficient and one of the resistors with a negative temperature coefficient.

In accordance with a concomitant feature of the invention, there is provided an insulator, the series resistor with a negative temperature coefficient being a substrate for the parallel circuit of the resistors with negative and positive temperature coefficients, with the parallel resistor with a negative temperature coefficient being disposed on the substrate resistor, and the resistor with a positive temperature coefficient being disposed on the parallel resistor with a negative temperature coefficient through the insulator.

Other features which are considered as characteristic for the invention are set forth in the appended claims.

Although the invention is illustrated and described herein as embodied in a hybrid thermistor temperature sensor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 5:
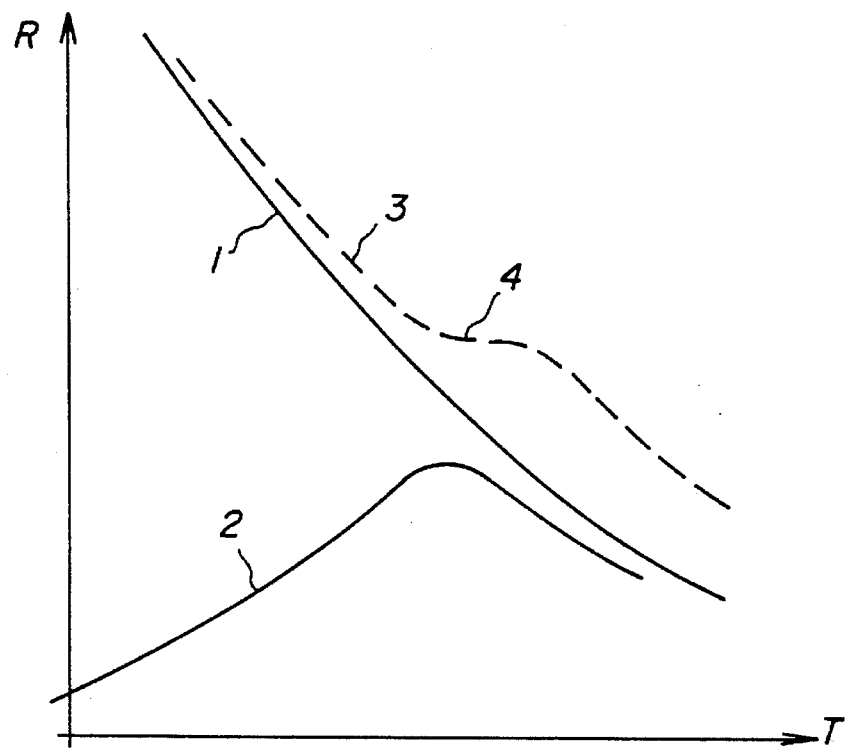
FIG. 5 is a diagram showing a temperature/resistance curve of a known hybrid thermistor temperature sensor.

Referring now to the figures of the drawing in detail and first, particularly, to FIG. 5 thereof, there is seen a temperature/resistance characteristic diagram of a thermistor temperature sensor according to Published European Application No. 0 532 890 A1. Such thermistor temperature sensors are in the form of a two-pole network of temperature-dependent resistors with positive and negative temperature coefficients, that are placed in thermal and electrical contact with each other.

In such a known thermistor temperature sensor, there is an electrical series connection of a temperature-dependent resistor with a negative temperature coefficient and a temperature-dependent resistor with positive temperature coefficient, i.e., a hot conductor and a cold conductor. The temperature/resistance characteristic of such a thermistor temperature sensor is negative on the whole and has a plateau which is centered around a given temperature. If such a thermistor temperature sensor is used as a temperature sensor for a motor vehicle, the plateau is centered around the normal detected working temperature of the motor vehicle, so that tolerances in the sensor system and normal fluctuations in the working temperature are not picked up by a vehicle temperature display. Only abnormal temperature changes resulting from malfunction or overload conditions are indicated.

In the temperature/resistance characteristic diagram of the thermistor temperature sensor shown in FIG. 5, the resistance R of the thermistor temperature sensor (on a logarithmic scale) is plotted against the temperature T in °C. A curve 1 is the characteristic of a hot conductor, while a curve 2 is the characteristic of a cold conductor. In a known manner, the characteristic 2 of the cold conductor after a maximum resistance passes into a region of the curve in which the cold conductor has hot-conductor properties. By superpositioning of the respective characteristics 1 and 2 for the hot conductor and the cold conductor, a characteristic 3 of the thermistor temperature sensor is created. If the cold conductor in series with the hot conductor is in the working temperature region of the thermistor temperature sensor past the maximum resistance of curve 2, a constant resistance behavior or trend or plateau 4 is created in a predetermined temperature region of the thermistor temperature sensor curve 3, so that the properties as discussed above for temperature fluctuations are achieved.

Figure 1:
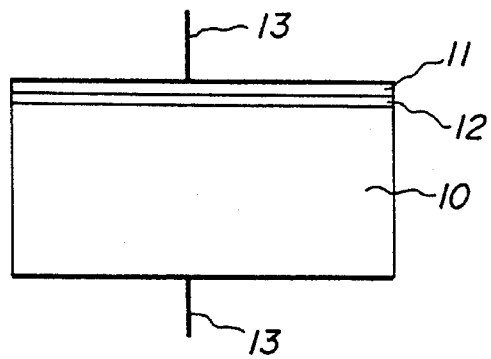
FIGS. 1–4 are diagrammatic, elevational views of four respective embodiments of a hybrid thermistor temperature sensor according to the invention.

In the embodiment of a hybrid thermistor temperature sensor of the invention according to FIG. 1, a temperature-dependent resistor 11 with a positive temperature coefficient is provided on a temperature-dependent resistor 10 with a negative temperature coefficient through an electrode 12. The thermistor temperature sensor is provided with connection wires 13 through non-illustrated connection electrodes. Thus, it includes an electrical two-pole network that is electrically accessible from the outside through the connection wires 13.

According to the invention, the electrode 12 is made of a material which assures a contact between the hot conductor 10 and the cold conductor 11 that breaks down the barrier layer and forms a barrier to the mutual diffusion of ingredients of the contacting temperature-dependent resistors 10 and 11 into each other.

In the manufacture of such a thermistor temperature sensor, the hot conductor 10 is produced by known technologies. For example, one may employ a disk or wafer technology, in which case the geometry has no influence on the further processing steps. On this hot conductor 10, the connection electrode 12 is mounted in a layer technology, e.g., by sputtering, CVD, MOCVD, laser ablation, or silk screening. In turn, the cold conductor 11 is mounted on this electrode 12 in one of the aforesaid layer techniques.

Materials which can be considered for the electrode 12 are electrically conducting carbides, nitrides, oxide-nitrides and/or oxides, in particular a material from the group of TiC, SiC, TiN, TiAlN, TiON, TiAlON and InSn-oxide can be used.

The contacts of the hybrid thermistor temperature sensor at either side are advantageously produced by sputtering of Cr-Ni-Ag electrodes.

The cold conductor 11 is preferably constructed as a thin layer in order to accomplish the necessary low impedance of the resistor.

Figure 2:
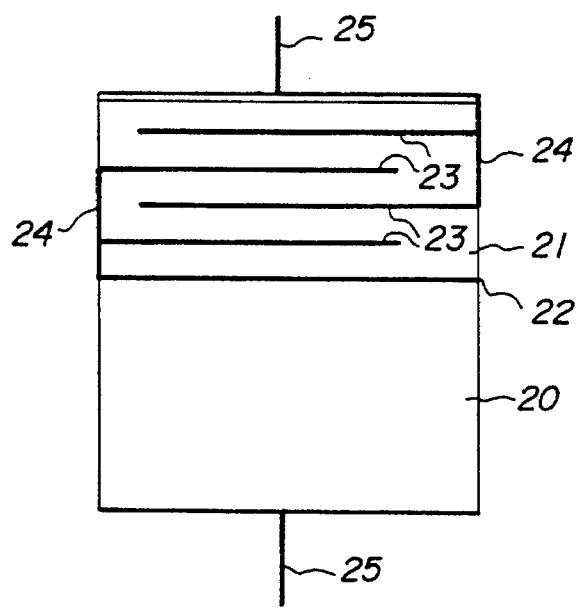

In the embodiment of a hybrid thermistor temperature sensor according to FIG. 2, there is a combination of a temperature-dependent resistor 20 with a negative temperature coefficient (hot conductor) and a temperature-dependent resistor 21 with a positive temperature coefficient (cold conductor), which are electrically coupled to each other through an electrode 22. In this embodiment, the cold conductor 21 is constructed as a multilayered element, having individual layers which are each separated from each other by internal electrodes 23 which, in turn, are alternately electrically joined to each other by metal contact strips 24. The overall thermistor temperature sensor is in turn electrically accessible from the outside through connection wires 25 and non-illustrated contact electrodes.

In order to manufacture such a thermistor temperature sensor according to FIG. 2, one can also employ the aforesaid technologies, which is especially true of the configuration of the electrode 22 of the invention electrically coupling the hot conductor 20 and the cold conductor 21.

Figure 3:
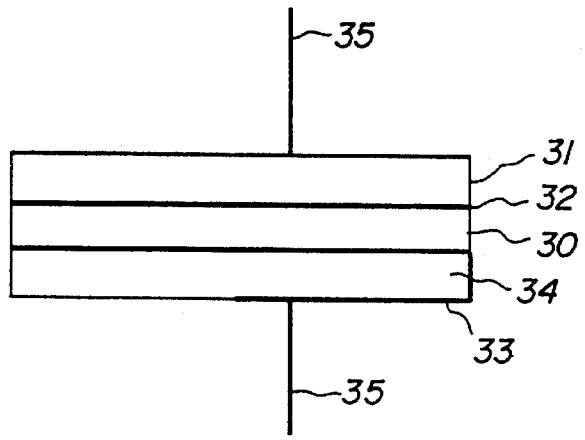

In the embodiment of a thermistor temperature sensor of the invention according to FIG. 3, a temperature-dependent resistor 30 with a negative temperature coefficient (hot conductor) on an electrically inactive (insulating) substrate 34 and a temperature-dependent resistor 31 with a positive temperature coefficient (cold conductor) are provided, across an electrode 32 having the configuration according to the invention as described above. In order to contact the hot conductor 30, an electrode 33 is led around the substrate 34, again ensuring electrical accessibility from the outside by connection wires 35.

Again, the manufacturing is carried out by the above-described technologies, and the embodiments of the electrode 12 of FIG. 1 apply especially to the electrodes 32 and 33.

Figure 4:
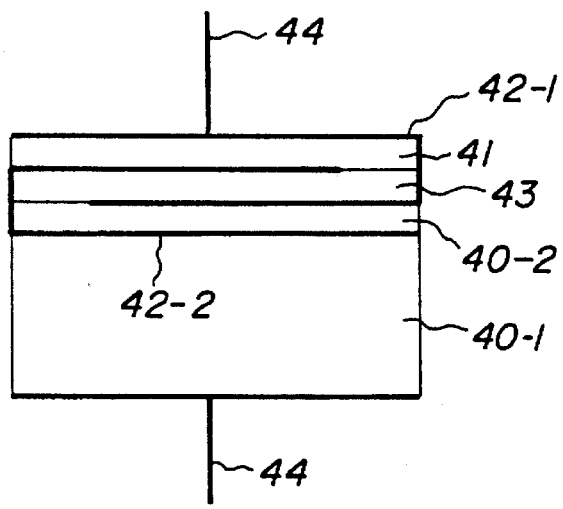

FIG. 4 shows an embodiment of a thermistor temperature sensor according to the invention having two temperature-dependent resistors 40-1 and 40-2 with a negative temperature coefficient (hot conductor) and one temperature-dependent resistor 41 with a positive temperature coefficient (cold conductor), and an insulator 43 provided between the hot conductor 40-2 and the cold conductor 41. The contact is produced in the described manner by means of electrodes 42-1 and 42-2, which are suitably led around the temperature-dependent resistor elements 40-2 and 41 as well as the insulator 43. Electrical accessibility from the outside again occurs through connection wires 44. The remarks concerning fabrication with respect to the above-described embodiments according to FIGS. 1–3 also apply to this embodiment.

We claim:

1. A hybrid thermistor temperature sensor, comprising:

a two-pole network of temperature-dependent resistors being in thermal and electrical contact with each other, said two-pole network having at least one temperature-dependent resistor with a positive temperature coefficient as a cold conductor, at least one temperature-dependent resistor with a negative temperature coefficient as a hot conductor, a temperature/resistance curve with a constant behavior or plateau in a predetermined temperature region, and at least one electrode electrically coupling at least two of said temperature-dependent resistors to each other, said at least one electrode being produced from a material ensuring a contact between said temperature-dependent resistors that breaks down a barrier layer and forms a diffusion barrier to a mutual diffusion of ingredients of each respective one of said contacting temperature-dependent resistors into the other of said temperature-dependent resistors.

2. The thermistor temperature sensor according to claim 1, wherein said electrode material is at least one material selected from the group consisting of electrically conducting carbides, nitrides, oxide-nitrides and oxides.

3. The thermistor temperature sensor according to claim 1, wherein said electrode material is selected from the group consisting of TiC, SiC, TiN, TiAlN, TiON, TiAlON and InSn-oxide.

4. The thermistor temperature sensor according to claim 1, wherein said two-pole network has a series circuit of said resistor with a negative temperature coefficient, said resistor with a positive temperature coefficient, and said electrode disposed between said resistors.

5. The thermistor temperature sensor according to claim 4, wherein said resistor with a negative temperature coefficient serves as a substrate for said electrode and said resistor with a positive temperature coefficient.

6. The thermistor temperature sensor according to claim 1, wherein said resistor with a positive temperature coefficient is constructed as a one-piece disk.

7. The thermistor temperature sensor according to claim 1, wherein said resistor with a positive temperature coefficient is constructed as a multilayer element.

8. The thermistor temperature sensor according to claim 1, including an electrically inactive substrate on which a combination of said resistors with negative and positive temperature coefficients are disposed.

9. The thermistor temperature sensor according to claim 1, wherein said two-pole network has a combination of at least three of said resistors with negative and positive temperature coefficients being electrically coupled to each other through said electrodes.

10. The thermistor temperature sensor according to claim 9, wherein said two-pole network has a combination of two of said resistors with a negative temperature coefficient and one of said resistors with a positive temperature coefficient being electrically coupled with each other through said electrodes, with one of said resistors with a negative temperature coefficient being in series with a parallel circuit of one of said resistors with a positive temperature coefficient and one of said resistors with a negative temperature coefficient.

11. The thermistor temperature sensor according to claim 10, including an insulator, said series resistor with a negative temperature coefficient being a substrate for said parallel circuit of said resistors with negative and positive temperature coefficients, with said parallel resistor with a negative temperature coefficient being disposed on said substrate resistor, and said resistor with a positive temperature coefficient being disposed on said parallel resistor with a negative temperature coefficient through said insulator.

* * * * *